United States Patent [19]

Kraft et al.

[11] 4,176,143
[45] Nov. 27, 1979

[54] HIGHLY REACTIVE POWDER RESIN COMPOSITIONS CONTAINING POLYCARBOXYLIC ACID ANHYDRIDES

[75] Inventors: Kurt Kraft, Auringen; Gerd Walz, Breckenheim, both of Fed. Rep. of Germany

[73] Assignee: Hoechst Aktiengesellschaft, Frankfurt, Fed. Rep. of Germany

[21] Appl. No.: 750,135

[22] Filed: Dec. 13, 1976

[30] Foreign Application Priority Data

Dec. 13, 1975 [DE] Fed. Rep. of Germany ....... 2556182

[51] Int. Cl.² .................. C08L 63/00; C08L 67/00
[52] U.S. Cl. .................. 260/835; 525/411; 260/22 T; 525/413; 525/418; 260/22 EP; 525/61; 525/533; 260/37 EP; 260/38; 260/40 R; 427/195; 427/27; 428/417; 428/418; 428/430; 428/458; 528/87; 528/266
[58] Field of Search .................. 260/78.41, 835, 860, 260/47 EA, 2 EA, 75 T, 75 R, 831, 834, 836, 837, 67.6 R, 72 R, 59 R, 77.5 NC; 427/195, 185, 27

[56] References Cited

U.S. PATENT DOCUMENTS

| 3,842,035 | 10/1974 | Klaren | 260/860 |
| 3,919,172 | 11/1975 | Rhein et al. | 260/75 R |
| 3,932,358 | 1/1976 | de Cleur et al. | 260/75 N |
| 3,991,034 | 11/1976 | Takeo et al. | 260/75 NK |
| 4,009,223 | 2/1977 | Noonan | 260/830 TW |
| 4,040,993 | 8/1977 | Elbling | 427/27 |

FOREIGN PATENT DOCUMENTS

1305427 1/1973 United Kingdom .
1339377 12/1973 United Kingdom .

OTHER PUBLICATIONS

Powder Coating; Journal of Paint Technology; 2/1972; vol. 44, No. 565, pp. 30-37.

*Primary Examiner*—Theodore E. Pertilla
*Attorney, Agent, or Firm*—Littlepage, Quaintance, Murphy, Richardson and Webner

[57] ABSTRACT

A highly-reactive powder resin composition suitable for use in the production of coatings comprising a mixture of (A) at least one polymer containing groups selected from hydroxyl and epoxy-groups, having a melt viscosity of 2 000 to 20 000 cP at 160° C. and a melting range of from 45° to 95° C.; and (B) at least one compound of formula

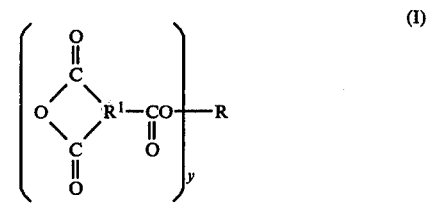

(I)

wherein

R represents an aliphatic hydrocarbon group—being substituted by an ester or a carboxy group or being interrupted by an O-ether linkage —

$R^1$ represents phenyl or naphthyl and y is an integer from 2 to 4 said component B having a melt viscosity of 50 to 15 000 cP at 160° C. and a melting range of from 40° to 250° C.;

the combination of A and B having a melt viscosity of from 500 to 20 000 cP at 160° C., a stability of from 1 to 15 at 100° C., a flow time of from 20 to 600 s at 160° C., and a gel time of from 35 to 1,200 s at 160° C. and an article coated with said composition.

16 Claims, 24 Drawing Figures

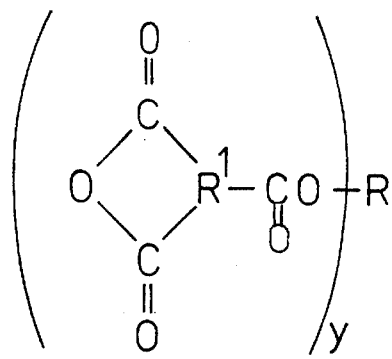
FIG. I
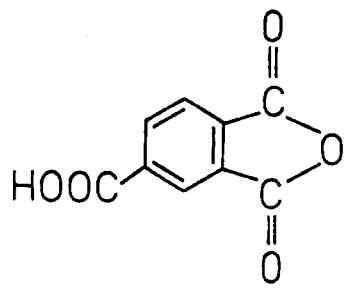
FIG. II
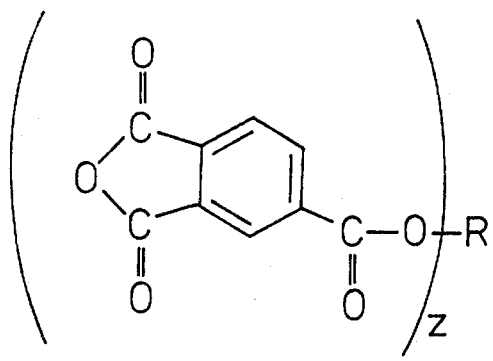
FIG. III
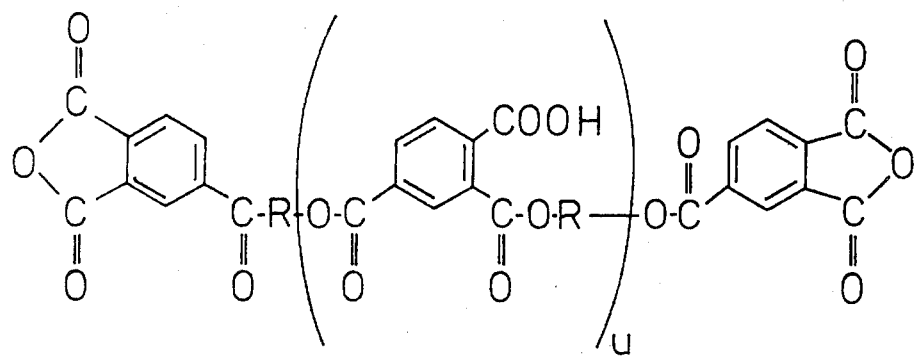
FIG. IV

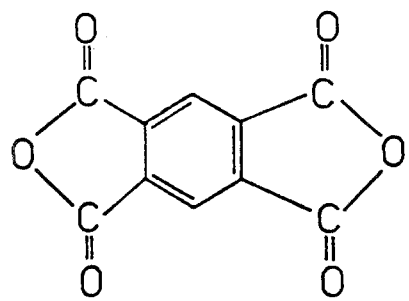
FIG. V
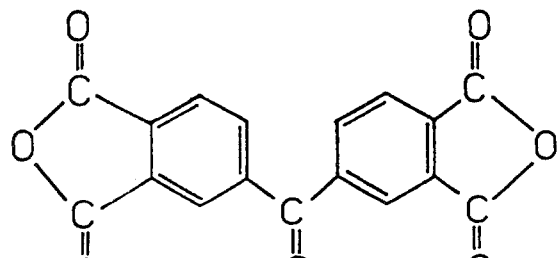
FIG. VI
FIG. VII
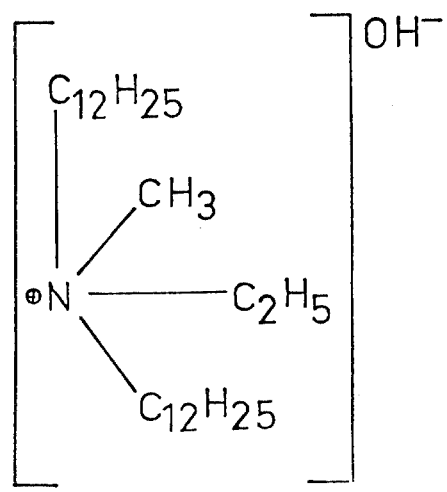
FIG. VIII
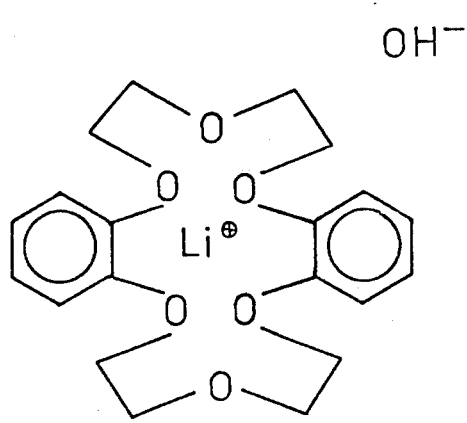
FIG. IX

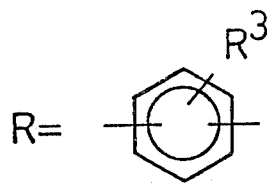
FIG. X
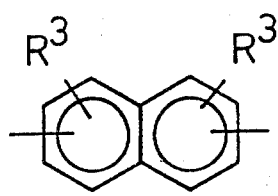
FIG. XI
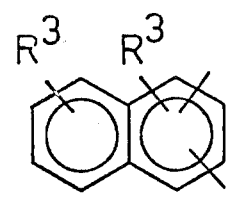
FIG. XII
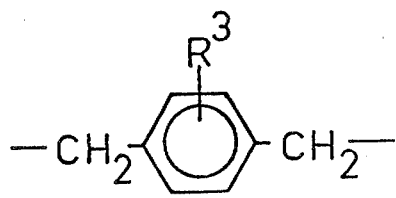
FIG. XIII
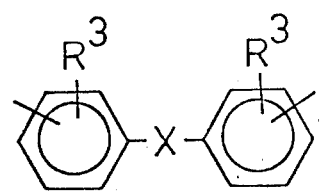
FIG. XIV
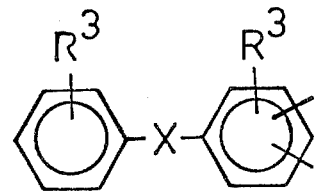
FIG. XV

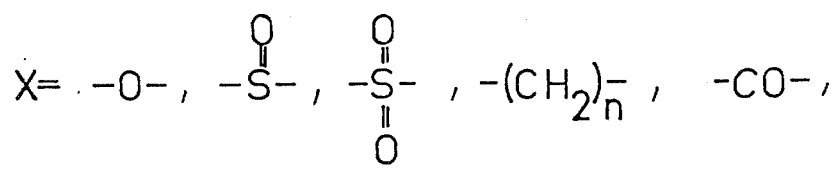
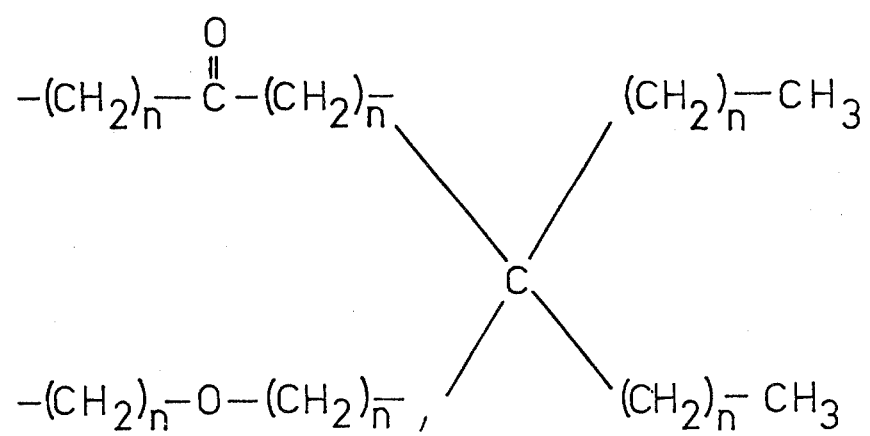
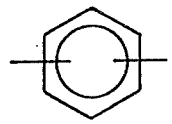
FIG. XV a
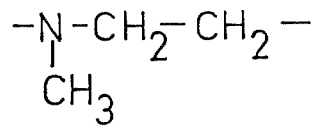
FIG. XVI
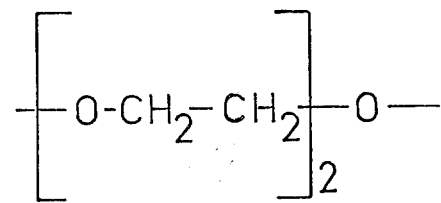
FIG. XVII

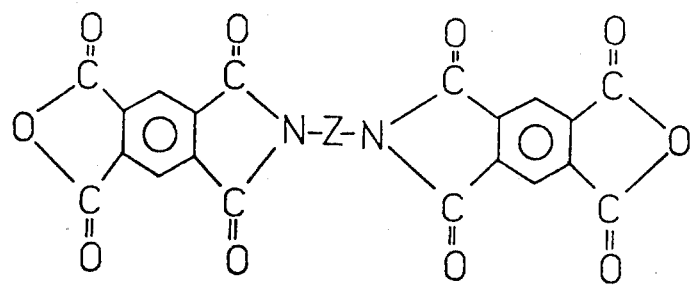
FIG. XVIII
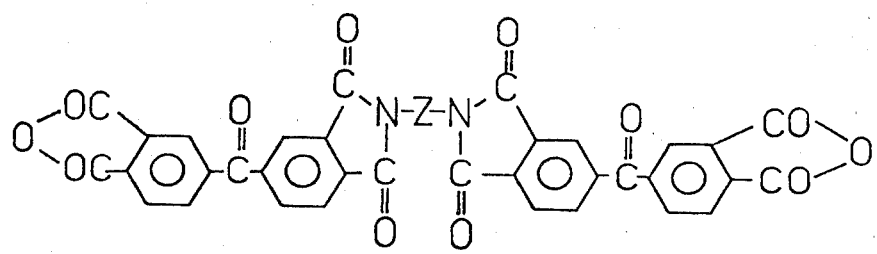
FIG. XIX
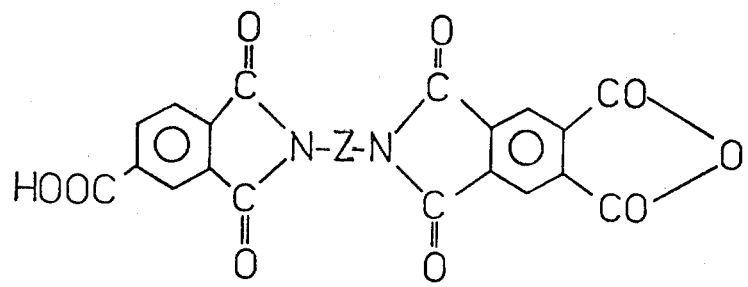
FIG. XX
$X = (CH_2)_m, \quad m = 2-8$

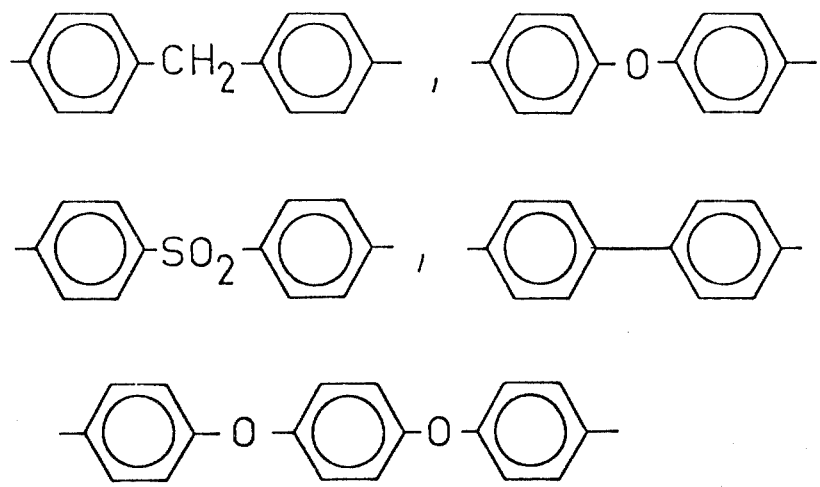
FIG. XXa
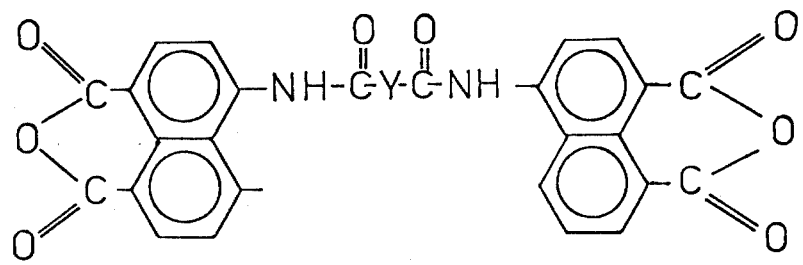
FIG. XXI
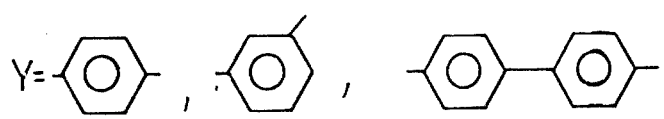
FIG. XXII
=(CH$_2$)$_p$    p=2-8

HIGHLY REACTIVE POWDER RESIN COMPOSITIONS CONTAINING POLYCARBOXYLIC ACID ANHYDRIDES

This invention relates to a process for the preparation of highly reactive powder resin compositions suitable for use in the production of coatings.

It is known that solvent-free enamel systems based on hydroxyl group-containing polyesters and polyepoxides can be converted into substantially insoluble polymers by reaction with anhydride group-containing compounds. This so-called hardening process generally takes place at generally elevated temperatures. As the so-called "anhydride hardeners", pyromellitic dianhydride, benzophenone tetracarboxylic dianhydride or special ester anhydrides of trimellitic acid may be used.

In tests for suitability as solvent-free powdered coating agents (hereinafter called "power resins"), of a large number of standard commercial hydroxyl group-containing polyesters, polyepoxides as well as their mixtures in combination with the abovementioned "anhydride hardeners", it became evident that the hardened coatings, in the majority of cases, exhibit exceptionally poor surface qualities, inadequate chemical resistance and unsatisfactory mechanical properties. With some compositions the mechanical properties could be improved somewhat if hardening was effected at high temperatures over long stoving periods, e.g. 200° C. for 30 minutes. However, under the generally desired hardening conditions of from 120° to 160° C. for not more than 30 minutes or at higher temperatures with correspondingly shorter stoving times, e.g. 180° C. and a 5 minute stoving period, totally unusable coatings were obtained.

Surprisingly, we have now found it possible to produce satisfactory coatings under the above mentioned conditions by using highly reactive powder resin compositions based on a mixture of hydroxyl and/or epoxy group-containing polymers and an anhydride hardener.

Formula I is FIG. I;
Formula II is FIG. II;
Formula III is FIG. III;
Formula IV is FIG. IV;
Formula V is FIG. V;
Formula VI is FIG. VI;
Formula VII is FIG. VII;
Formula VIII is FIG. VIII;
Formula IX is FIG. IX;
Formula X is FIG. X;
Formula XI is FIG. XI;
Formula XII is FIG. XII;
Formula XIII is FIG. XIII;
Formula XIV is FIG. XIV;
Formula XV is FIG. XV;
Formula XVa is FIG. XVa;
Formula XVI is FIG. XVI;
Formula XVII is FIG. XVII;
Formula XVIII is FIG. XVIII;
Formula XIX is FIG. XIX;
Formula XX is FIG. XX;
Formula XXa is FIG. XXa;
Formula XXI is FIG. XXI; and
Formula XXII is FIG. XXII.

Thus, according to one aspect of the present invention there is provided a highly-reactive powder resin composition suitable for use in the production of coatings comprising a mixture of (A) at least one hydroxyl and/or epoxy-group containing polymer with a melt viscosity (as herein defined) of 2000 to 20000 cP at 160° C. and a melting range (as herein defined) of from 45° to 95° C.; and (B) at least one compound of the formula $$\left\{ \begin{array}{c} O \\ \parallel \\ C \\ O \diagdown \diagup R^1 - CO \\ C \\ \parallel \\ O \end{array} \right\}_y R \qquad (I)$$

[wherein R represents a mono- to pentavalent straight-chain or branched aliphatic hydrocarbon group containing from 1 to 28 carbon atoms, optionally interrupted at least once by O-ether linkages or by a —HC=CH— group, or optionally substituted by an ester group containing from 1 to 6 carbon atoms, or by a carboxy group; a piperazine group or a group of the formula $$-N-CH_2-CH_2 \quad \text{or} \quad -\!\!\!+\!\!\!O-CH_2-CH_2\!\!\!\!\!\!-\!\!\!+_{\overline{2}}O-;$$
$$\phantom{xxxxx}|$$
$$\phantom{xxxx}CH_3$$
$$\phantom{xxxx}(XVI) \phantom{xxxxxxxx} (XVII)$$

an aromatic group containing from 6 to 43 carbon atoms of the formula (X)  (XI)  (XIII)

(XIII)  (XIV)

or (XV)

(wherein each of the aromatic nuclei is substituted by a group $R^3$ which represents hydrogen, a halogen atom, or an alkyl or alkoxy group containing from 1 to 6 carbon atoms, and X represents an oxygen atom, a sulphinyl, sulphonyl or carbonyl group or a group of the formula

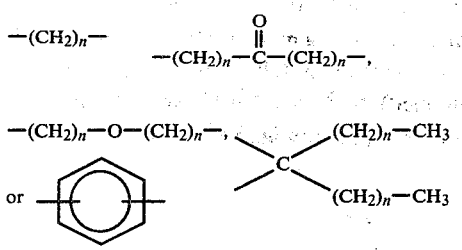

in which n is an integer from 1 to 8, preferably from 1 to 4); $R^1$ represents a phenyl, naphthyl, phenanthryl, aminonaphthyl or a heterocyclic tetrahydrofuryl group such that the anhydride grouping is attached to the said $R^1$ group on vicinyl carbon atoms; and y is an integer from 2 to 4] with a melt viscosity (as herein defined) of 50 to 15000 cP at 160° C. and a melting range (as herein defined) of from 40° to 250° C.; and the combination of A and B having a melt viscosity (as herein defined) of from 500 to 20000 cP at 160° C., a stability (as herein defined) of from 1 to 15 at 100° C., a flow time (as herein defined) of from 20 to 600 s at 160° C., and a gel time (as herein defined) of from 35 to 1,200 s at 160° C.

In the compositions according to this invention, component A preferably has a melt viscosity of 3000 to 10000 cP at 160° C. and a melting range of from 50° to 75° C., component B preferably has a melt viscosity of 80 to 4000 cP at 160° C. and a melting range of 50° to 160° C. The combination of A and B preferably has a melt viscosity of 1500 to 8000 cP at 160° C., a stability of from 1.2 to 5 at 100° C., a flow time of from 85 to 300 s at 160° C. and a gel time of from 120 to 600 s at 160° C.

In component B the group R advantageously contains from 1 to 15, e.g. 2 to 8 carbon atoms, and when R is substituted by an ester group, the ester group preferably contains 1 to 3 carbon atoms.

R may represent, for example, a straight-chained or branched alkylene group with 2 to 8, preferably 2 to 4 carbon atoms or a straight-chained or branched alkyl ether group, preferably with a total of up to 6 carbon atoms.

The term "polymer" as used herein is used in its broadest sense and is intended to include oligomers; thus it also includes compounds made up of at least two structure units of the components on which the polymer is based. In this context, the term "oligomer" includes compounds with up to 10, preferably up to 5 molecular units. In R, the aliphatic hydrocarbon group may be straight-chained or branched and the aromatic group may be mono- or polynucleic. By "melt viscosity" ($\eta_s$) as used herein is meant the viscosity found in a melt at 160° C. in a heatable plate-cone melting viscosimeter (Haake RV3, PK 401 W type). The melting points or melt ranges may be determined by the capillary method according to DIN 53 181. The stability (S) was determined by two measurements each at 100° C., again in the viscosimeter mentioned above. It is defined by the factor melt viscosity after ten minutes/initial melt viscosity The flow time (VZ) is the time, in seconds, taken for the melt viscosity determined in the above-mentioned viscosimeter to reach the value 50,000 cP at 160° C. The gel time (GZ) is defined by the time in seconds for the melt viscosity measured as above to reach the value $10^7$ cP at 160° C.

The temperatures of 100° and 160° C., at which the above mentioned physical properties of the components and compositions of the present invention are measured, were chosen because they correspond more or less to the average optimum processing temperature, owing to the high reactivity of the components.

Appropriately, the weight ratio of component A to component B is 40:60 to 95:5, preferably 60:40 to 90:10.

Suitable polymers of component A are, for example, saturated or unsaturated polyesters with free hydroxy groups; homo- or copolymers comprising hydroxy groups, e.g. those based on hydroxyalkyl esters of acrylic and/or methacrylic acid with optionally unsaturated monomers such as acrylic or methacrylic acid esters, acrylo- or methacrylonitrile, acryl- or methacrylamide, styrene, methylstyrene, vinyl toluene; polyvinyl alcohol; phenol resins with at least one free hydroxymethyl and/or hydroxyethyl group; amino resins with N-alkylol groups or the like; epoxy resins with epoxy values of from 0.02 to 0.35, preferably 0.028 to 0.28, which can be prepared in per se known manner from phenols, epichlorohydrin and, if desired, alcohols, and which may be modified with acids (to form esters) or with diketene (to form acetoacetic ester groups); and also epoxy resins in the form of glycidyl esters which have been obtained, for example, by esterification of epoxy compounds such as epichlorohydrin, oligomeric alkylene oxides or the like with saturated or unsaturated carboxylic acids, such as, for example, phthalic acid, isophthalic acid, hexahydrophthalic acid, adipic acid, acrylic, methacrylic, maleic and fumaric acid or oligomeric carboxylic compounds, such as oligomeric carboxylic acid esters, or from polyols and polycarboxylic acids or lower polymers of e.g. acrylic or methacrylic acid.

The polyesters mentioned above may be prepared from known polycarboxylic acids, such as phthalic acid, isophthalic acid, terephthalic acid, hexahydrophthalic acid, trimellitic acid, adipic acid, fumaric acid, maleic acid, endomethylene- tetra- or -hexa-hydrophthalic acid, optionally together with monocarboxylic acids, such as benzoic acid, butylbenzoic acid, lauric acid, isononanoic acid, fatty acids of naturally occurring oils or mixtures of the above acids. Suitable alcohol components of these polyesters are, for example, polyhydric alcohols, such as ethylene glycol, propane diols, butane diols, pentane diols, hexane diols, diethylene glycol, trimethylolethane or -propane, pentaerythritol, dipentaerythritol, bis-hydroxyethyl- iso- or terephthalic acid esters, tris-hydroxyethyl isocyanurate, optionally together with monohydric alcohols, such as lauryl alcohol, octyl alcohol, linoleyl alcohol or the like, either alone or in admixture. However, the monovalent acid or alcohol components are desirably present in minor amounts, e.g. up to 10 equivalent percent, based on the appropriate acid or alcohol component. Products having a proportion of at least trivalent portions are preferred. The proportion of OH groups which are bonded to at least trihydric alcohols is advantageously at least 50 equivalent percent.

Another possibility is that polyesters of component A are obtained by at least partial chemical degradation of high molecular weight polyesters of an aromatic nature, such as terephthalic acid-ethylene glycol or -butane diol polyesters, isophthalic acid-ethylene glycol or -hexane diol polyesters, under the effect of mono- and/or polyhydric alcohols, esters, dicarboxylic acids or the like. If the reaction is carried out with monohydric alcohols, they may be reacted in a deficient amount.

If hydroxy and epoxy compounds are present together, the weight ratio of hydroxy compounds on the one hand and epoxy compounds on the other hand in component A may be varied as desired; it is preferably 20:80 to 100:0.

Surprisingly, it has been found that the chemical structure of component A has only a minor effect on the quality of the powder coatings prepared from the compositions according to the invention. This is dependent to a far greater extent on the above mentioned physical parameters of the mixture.

Appropriately, 100 g of component B contain 0.34 to 0.48, preferably 0.4 to 0.42 anhydride groups, since in this case coatings with particularly good qualities are obtained.

As a rule, a mixture of monomers and/or oligomers will be used as component B. However, it is also possible to use an oligomeric substance containing, for example, one or more anhydride groups and optionally additional free carboxylic and/or ester groups.

Component B advantageously comprises at least one of the following compounds

Frequently, the use of a mixture of at least two of the compounds of formulae II to IV with at least one compound of formula

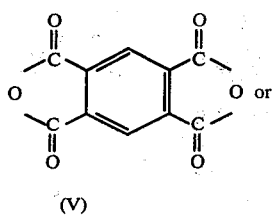

(V)

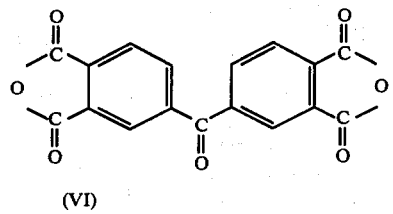

(VI)

as component B is advantageous. The proportion of compounds of formula V and VI may together form, for example, up to 50% by weight of component B.

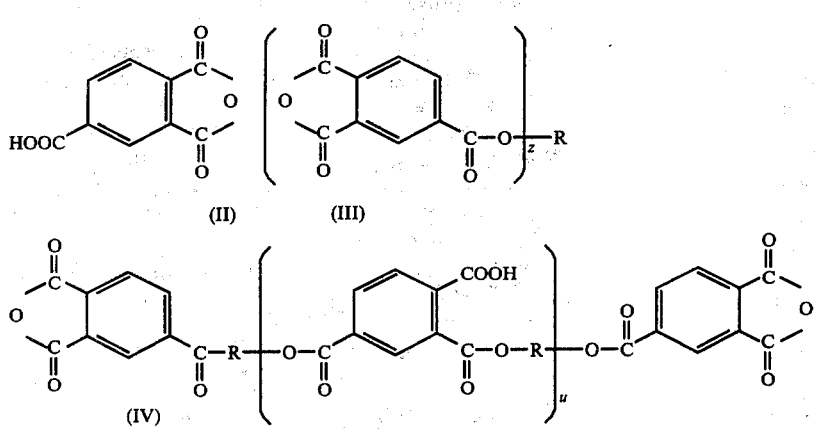

(II)    (III)

(IV)

In these formulae, R is as hereinbefore defined, z represents 2 or 3, and u represents an integer from 1 to 8, preferably up to 5.

Component B may, for example, represent a mixture of at least two of the compounds of formulae II to IV, e.g. trimellitic anhydride with monomeric or oligomeric compounds of formula III (wherein z is 2 or 3), and/or with such compounds of formula IV. The required ranges of the above-indicated physical parameters can be adjusted particularly well with the mixtures. Advantageously the percentage weight ratio of the compounds of formula II, III and IV in these mixtures is (20 to 50):(20 to 90):(5 to 60) the sum of the components always being 100 percent.

The fact that very good results are also obtained with mixtures containing compounds of formulae V and VI is very surprising as in using under the same conditions powder compositions from mixtures of component A with pure pyromellitic anhydride (formula V) and/or with pure benzophenone-tetracarboxylic anhydride (formula VI) only coatings with insufficient properties are obtained.

Component B may also additionally contain other acid anhydrides, e.g. those of phthalic acid, 4-aminophthalic acid, naphthalic acid, 4-amino-naphthalic acid, tetrahydrofuran tetracarboxylic acid, benzofuran tetracarboxylic acid, benzofuran hexacarboxylic acid, and also those of formulae

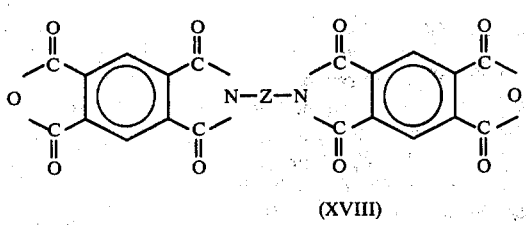

(XVIII)

-continued

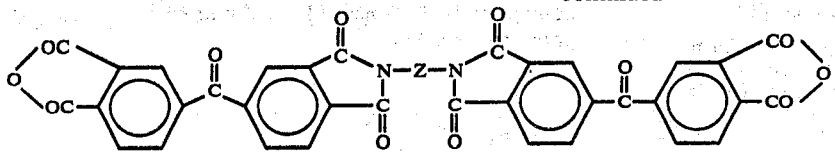

(XIX)

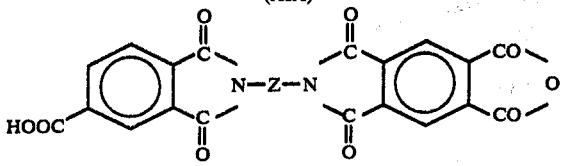

(XX)

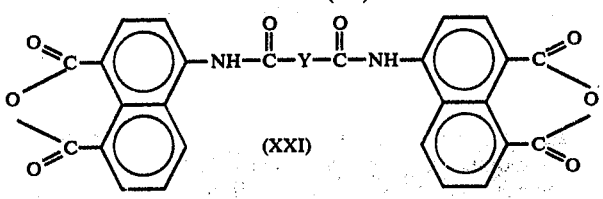

(XXI)

[wherein Z represents a group of the formula —(CH$_2$)$_m$—(wherein m is from 2 to 8),

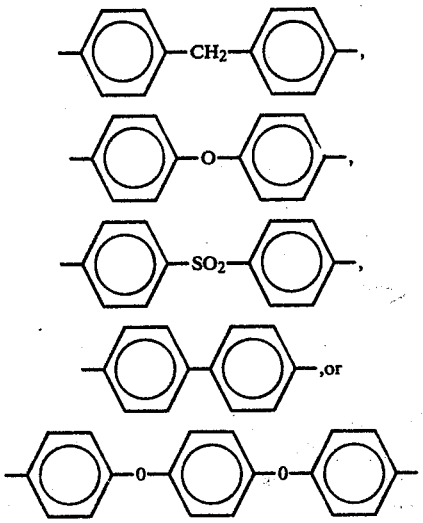

and Y represents a group of the formula —(CH$_2$)$_p$—(- wherein p is from 2 to 8),

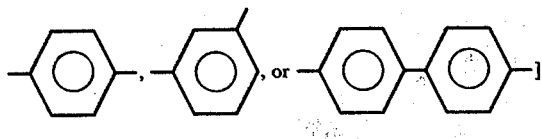

either alone or in admixture.

A suitable means of analysing these anhydride mixtures is, in particular, by gel permeation chromatography using polystyrene gel wetted with divinyl benzene as the adsorption medium and tetrahydrofuran as the eluant. With this method, it is possible to determine the exact composition of individual components in the anhydride mixtures, so that the relevant proportion of individual components can be adjusted easily and accurately. As well as the compounds of formulae II and III the oligomeric bisanhydrides of formula IV, which are extremely important for setting the parameter limits according to the invention, can also be resolved according to the number of aromatic nuclei and the quantities of these compounds can thus be determined.

The mixtures according to the invention may, for example, be prepared by comminuting the individual compounds, either on their own or together, e.g. by grinding. They may also be homogenised by dissolving the substances in suitable solvents and evaporating the solvent, optionally under reduced pressure and/or at elevated temperatures, or by mixing the components in a melt at suitable temperatures, e.g. in a kneader or extruder. It is often sufficient for only one of the two components to be molten. However, it is also possible for both components to be molten at the mixing temperature. The coatings may be applied using the methods conventional for powder enamel in the enamels industry, e.g. electrostatically, by whirl-sintering, dispersing or spraying.

The coating mixtures according to the invention may also contain conventional additives such as dyes, pigments, thinners, fillers, plasticisers, stabilisers, wetting agents, dispersing agents, lubricants, flow agents and catalysts in the usual amounts. These substances may be added to the individual components and/or to the total mixture.

The use of dyes and pigments is of most importance when the coating agents according to the invention are used as enamel paints, e.g. as anti-corrosion primers, undercoating paints or covering paints. The weight ratio of solids in the binder to the total quantity of pigment is then advantageously within the range from 1:0.1 to 1:10, preferably 1:0.5 to 1:5. Examples of dyes and pigments for use in this type of composition are, for example, titanium dioxide, graphite, carbon black, zinc chromate, strontium chromate, barium chromate, lead chromate, lead cyanamide, lead silicochromate, calcium molybdenate, manganese phosphate, zinc oxide, cadmium sulphide, chromium oxide, zinc sulphide, nickel titanium yellow, chromium titanium yellow, iron oxide red, iron oxide black, ultramarine blue, phthalocyanin complexes, or naphthol red. Surprisingly, it does not appear to matter whether the colouring pigments are inorganic or organic.

We have found that the mixtures according to the invention make it possible to harden powder enamels based on OH group-containing polyester resins in combination with component B, i.e. an anhydride hardener at low stoving temperatures, e.g. within the range from 120° to 180° C., preferably 130° to 160° C. This now makes it possible for a large number of heat-sensitive organic pigments to be used in this type of composition without the pigments being adversely affected by the stoving process.

Suitable fillers in the compositions according to the invention include, for example, talc, mica, kaolin, chalk, quartz powder, asbestos powder, ground shale, barium sulphate, silicates, glass fibre, or organic fibres.

Suitable flow agents include, for example, ketone resins, anhydride group-containing telomers, such as styrene-maleic anhydride telomers, or oligomereric esters of acrylic or methacrylic acid.

Suitable hardening catalysts include, for example,, organic or inorganic zinc compounds, such as zinc acetylacetonate, zinc phosphorus-tungstate or acetate; cadmium, calcium and tin compounds, such as cadmium oxide, calcium carbonate, dibutyl oxo-tin, trimethyl tin acetate; organic or inoroganic phosphorus compounds, e.g. triphenyl phosphite, or acids of phosphorus; acids such as p-toluene sulphonic acid, 1,5-naphthalenedisulphonic acid or bases such as triethylamine diazadicyclooctane, triphenylphosphine, or triethanolamine.

The coating mixtures according to the invention may be applied to all kinds of substrates, provided or course that the substrates are able to withstand the hardening temperatures of the coating.

Suitable substrates for these coatings are, for example, ceramics, glass, concrete, plastics, and preferably metals, such as, for example, iron, zinc, copper, aluminium, steel, brass, bronze, or magnesium, and, if necessary, the receptiveness to adhesion and the resistance to corrosion of the substrate may optionally be enhanced by suitable mechanical and/or chemical pretreatment. However, we have found that the coating agents according to the invention adhere extremely well to all kinds of metal substrates without the additional application of an adhesion-improving primer or undercoat. Tests which we have conducted have shown the good adhesion of these enamels, which corresponds to the values GT OA to GT 1A according to the test requirements of DIN 53 151. Moreover, we have also shown that these coatings can be deformed very well, have high resistance to weathering and remarkable chemical resistance.

The coating agents according to the invention may be suitable for the preparation of anti-corrosive coatings and/or intermediate coatings for all kinds of applications, particularly as resistant enamels. They are also suitable for coating and finishing articles which come into contact with propellants and solvents, and also for protective coatings which are subjected to the effects of the atmosphere, such as road markings, coatings on household appliances, machines, vehicle components, components for electrical engineering purposes, particularly for electrical conductors, and coatings for articles subjected to thermal stress.

Owing to their favourable properties, the coating agents according to the invention are also predominantly suitable for one-coat enamelling. Depending on the choice of component A, sheet metal coated with the coating agents according to the invention can subsequently be deformed such as in deep drawing, bevelling, profiling, stamping or the like without an appreciable effect on the other favourable qualities. The initial coating layer applied to the article may be left as it is, or may also be used as an intermediate layer, i.e. as an undercoat for further coatings which may in turn consist of the same or a different conventional coating material.

The coatings obtained form glossy films with good mechanical and chemical resistance and good weathering properties. On the other hand, it is also possible to produce matt enamels with advantageous mechanical and chemical properties particularly when a mixture of polyesters and epoxy resins in any desired ratio, preferably in the ratio 20:80 to 100:0 as component A in combination with the special anhydrides of component B as desired are used. Surprisingly, there is no need for a higher proportion of pigments nd fillers for this type of composition.

In the following Examples, all percentages are by weight. The parameters of unpigmented powder resin mixtures given at the end of the Examples in Table 1 were in each case measured using the above-mentioned plate-cone melt viscosimeter. Unless otherwise stated, the melt viscosity was in each case measured at 160° C. The mixtures according to the Examples were each applied to sheet metal which had previously been phosphatised. The coatings applied were then stoved in an oven in which air circulated at various temperatures from 140° to 200° C. for 30 minutes. The stoved coatings were finally subjected to technical tests on the enamels, the results of which are given in Table 2 at the end of the Examples.

EXAMPLE 1

(a) Polyester: 601.4 g of dimethyl terephthalate (3.1 mol) are reacted with 384.4 g of ethylene glycol (6.2 mol) in the presence of 1.0 g of zinc acetate as catalyst at temperatures of from 135° to 210° C., until no more methanol is liberated. This takes about 7 hours. After cooling to 190° C., 83 g of dipropylene glycol (0.62 mol) and 310.9 g of trimethylol propane (2.32 mol) are added. Ethylene glycol is then distilled off under reduced pressure (25 mm Hg) over the range 120° C. to 207° C. until a sample has a melt viscosity of 9000 cP. The hydroxyl number of the polyester is 235.

(b) Anhydride hardener: A mixture of 29.8 g of trimellitic anhydride and 62.5 g of a mixture of two different bisanhydrides in a ratio of 1:1 of formula III (wherein in one of the compounds R represents isopropylene and in the other represents ethylene and in both cases z is 2) and 7.7 g of an oligomeric bisanhydride of formula IV (wherein R represents isopropylene and ethylene in more or less equal proportions and u is 5 to 6) is melt homogenised. The melt viscosity of the resulting anhydride hardener is 250 cp.

(c) Powder resin (unpigmented): 30 g of the anhydride hardener prepared in (b) are dissolved in a solvent mixture of 70 g of ethylene glycol monoethyl ether monoacetate and 30 g of tetrahydrofuran and a solution of 70 g of the polyester (a) in 70 g of ethylene glycol monoethyl ether acetate is added. The solvent is then removed from the mixture in a high vacuum thin layer evaporator at 50° C. and $10^{-2}$ mm Hg.

(d) Powder resin (pigmented): The powder resin (c) is pigmented with 30% by weight of titanium dioxide and electrostatically applied to phosphatised sheet iron in a layer 100μ thick. The coated sheets are stoved in an oven in which air circulates, at 140° to 200° C. for 30 minutes to yield a film 70 to 80μ thick.

EXAMPLE 2

(a) Polyester: The polyester is prepared by a similar method to Example 1(a), but usinng 2 g of magnesium acetate as catalyst instead of zinc acetate. The melt viscosity is 5400 cP, the hydroxyl number is 215.

(b) Anhydride hardener: 19.2 g of trimellitic anhydride, 47.2 g of bisanhydride of formula III (wherein R represents ethylene and z is 2) and 33.6 g of an oligomeric bisanhydride of formula IV (wherein R represents ethylene and u is 3) are melt homogenised according to Example 1(b). The melt viscosity is 700 cP.

(c) Powder resin (unpigmented): 25 g of the anhydride hardener (b) are wet ground with 75 g of the polyester (a) in a ball mill in the presence of n-hexane. After the hexane has been removed, the mixture is screened through a screen with a 60μ mesh width. The parameter values were found for the undersize particles.

(d) Powder resin (pigmented): The finely powdered and screened powder resin mixture (c) is pigmented with 30% titanium dioxide, electrostatically applied to pre-treated sheet iron and stoved according to Example 1.

EXAMPLE 3

(a) Polyester: A standard commercial terephthalate-based polyester with free OH groups (usually for use as a reaction component with isocyanates) with a melt viscosity of 1130 cP (Trade name "Crelan U 501") is used as the polyester starting material. Its hydroxyl content is 1.5%, acid number <15, iodine number <10 (50% solution in cyclohexanone).

(b) Anhydride hardener: 22.6 g of trimellitic anhydride, 65.4 g of a mixture of bisanhydrides of formula III (wherein 85% of group R is ethylene and 15% is isopropylene and in both cases z is 2) and 12 g of oligomeric bisanhydride of formula IV (wherein R represents ethylene and isopropylene and u=3 to 5) are melt homogenised. The melt viscosity is 250 cP.

(c) Powder resin (unpigmented): 20 g of the above anhydride hardener (b) are homogenised at 100° C. with 80 g of the polyester (a) in a double screw extruder.

(d) Powder resin (pigmented): Pigmentation and homogenisation of the mixture (c) are carried out in the extruder at 100° C., adding 30% by weight of titanium dioxide. The mixture is processed further analogously to Examples 1 and 2.

EXAMPLE 4

(a) Polyester: A standard commercial polyester with free OH groups (as is often used for a reaction component with isocyanates) is used as the polyester starting material. (Trade name "Crelan"U 502). The melt viscosity is 19600 cP, the hydroxyl content is 1.5% acid number<15, iodine number<5.

(b) Anhydride hardener: 16 g of trimellitic anhydride, 51 g of a bisanhydride of formula III (wherein R represents ethylene and z is 2) and 33 g of the oligomeric bisanhydride according to Example 3(b) are homogenised in a melt. The melt viscosity of the mixture is 1000 cP.

(c) Powder resin (unpigmented): 30 g of anhydride hardener prepared in (b) above are homogenised for 2 minutes at 100° C. with 70 g of polyester 4(c) in a laboratory kneader.

(d) Powder resin (pigmented): Homogenisation is carried out as in (c), but with the addition of 30% by weight of titanium dioxide.

Further processing is carried out as described in Examples 1 to 3.

EXAMPLE 5

(a) Polyester: a polyester with melting point of 50° to 56° C. and a melt viscosity of 600 cP is prepared from 4 mol of phenylglycidylether and one mole of pentaerythritol-tetra-half ester of phthalic acid.

(b) Anhydride hardener: 10 g of trimellitic anhydride, 70.5 g of bisanhydride of formula III (wherein R represents ethylene and z is 2) and 19.5 g of an oligomeric bisanhydride of formula IV (wherein R represents ethylene and u is 5) are melt homoginised. The mixture has a melt viscosity of 1100 cP.

(c) Powder resin (unpigmented): 28.5 g of anhydride hardener (b) and 71.5 g of polyester (a) are ground together very finely.

(d) Powder resin (pigmented): The mixture from (c) is melt homogenised at 100° C. with 30% by weight of titanium dioxide in a toothed disc stirrer. After cooling, the compound is powdered and screened to a particle size of less than 100μ.

Further processing takes place as described in Examples 1 to 3.

EXAMPLE 6

(a) Polyester: 198 g of polyethylene terephthalate are reacted under chemical degradation with 153 g of trimethylolpropane and 41 g of dipropyleneglycol between 220° and 250° C. 9.5 g of ethylene glycol are then distilled off at about 50 mm Hg up to a temperature of 210° C. After cooling, a slightly cloudy polyester resin is obtained. Melting range 75° to 80° C., melt viscosity 52000 cP, hydroxyl number 165.

(b) Anhydride hardener: 3 g of trimellitic anhydride, 87 g of a compound of formula III (wherein R represents ethylene and z is 2) 10 g of an oligomeric bisanhydride of formula IV (wherein R represents

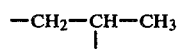

and u is 3) are melt homogenised. The mixture has a melting point of 150° C. and a melt viscosity of 130 cP.

(c) Powder resin (unpigmented): 25 g of the anhydride hardener (b) are very finely ground with 75 g of the polyester (a) in a ball mill.

(d) Powder resin (pigmented): The powdered mixture (c) is pigmented in a dye mill with 30% by weight of titanium dioxide and enough n-hexane to produce an easily grindable paste. The solvent is then removed under reduced pressure. The mixture is electrostatically applied to pretreated metal sheets and stoved as described above.

EXAMPLE 7

(a) Polyester: 763.6 g of isophthalic acid are heated with 855.6 g of ethylene glycol to 170°-195° C. in the presence of xylene as entraining agent for the reaction water, and 0.5 g of 85% of phosphoric acid until total esterfication is achieved. Then 823.5 g of trimethylolpropane are added at 85° C. and the mixture is reheated to 180° C. At this temperature 960 g of polyethyleneglycol terephthalate are added and the mixture is heated further up to a temperature of 220° C. The polymer goes into solution. Subsequently, ethylene glycol is distilled off at 140° to 235° C. unitl the reaction product has reached a hydroxyl number of 146. The clear light-coloured resin has a melt viscosity of 32000 cP.

(b) Anhydride hardener: The same hardener is used as in Example 4(b).

(c) Powder resin (unpigmented): 25 g of anhydride hardener 7(b) and 75 g of polyester (a) are dissolved in a mixture of 100 g of acetone and 50 g of butyl acetate by stirring at 15° C. for several hours. Then the solvent is removed under reduced pressure at $10^{-2}$ mm Hg. The remaining foamy compound is pulverised and screened to a particle size of less than $100\mu$.

(d) Powder resin (pigmented): This resin is obtained from the mixture prepared in (c) by adding 30% by weight of titanium dioxide before removing the solvent.

The pigmented powder resin mixture is applied to pretreated sheet iron in a layer $65\mu$ thick by whirl-sintering at 180° C. within a few seconds; and is then stoved for 30 minutes at 140° to 200° C.

EXAMPLE 8

(a) Polyester-acrylic resin: A solvent-free polyester-acrylic resin with an OH number of more than 90, a melting range from 45° to 50° C. and a melt viscosity of 18,000 cP is used.

(b) Anhydride hardener: The same hardener is used as in Example 6(b).

(c) Powder resin (unpigmented): 80 g of the polyester acrylic resin according to (a) and 20 g of the anhydride hardener (b) are very finely ground at −40° C.

(d) Powder resin (pigmented): 80 g of the polyester-acrylic resin (a) are extruded with 30% by weight (based on total mixture) of titanium dioxide at 100° C. The pigmented extruded material is very finely ground with 20 g of anhydride hardener (b) at −40° C. Metal sheets are coated electrostatically up to a layer thickness of $70\mu$.

EXAMPLE 9

(a) Polyester-acrylic resin: A solvent-free polyester-acrylic resin known by the trade name MACRYNAL SM 548 with an OH number of 66 and a melt viscosity of 19000 cP is used.

(b) Anhydride hardener: The anhydride hardener used is the same as in Example 6(b).

(c) Powder resin (unpigmented): 80 g of the polyester-acrylic resin 9(a) and 20 g of anhydride hardener (b) are dissolved, with stirring, at room temperature in 150 g of a mixture of 40 g of acetone, 45 g of ethyl acetate and 5 g of methylene chloride. After concentration in a high vacuum at 25° C. and $10^{-3}$ mm Hg, the residue obtained is pulverised.

(d) Powder resin (pigmented): Prepared and further processed as in (c), and using 30% by weight of titanium dioxide.

EXAMPLE 10

(a) Polyester: A mixture of 632.4 g of ethylene glycol (10.2 mol), 469 g of trimethylol propane (3.5 mol), 2095 g of 1,6-hexanediol (2.5 mol), 13.6 g of pentaerythritol (0.1 mol), 46.9 g of dipropyleneglycol (0.35 mol), 26 g of neopentylglycol (0.25 mol), 1862.4 g of dimethyl terephthalate (9.6 mol) and 1.5 g of sodium butoxide are transesterified at 78° to 210° C. until at least 612 g of methanol are distilled off. The mixture is then refluxed for 12 hours. After a fractionating column has been placed on top, ethylene glycol is first distilled off at normal pressure until the temperature in the reaction mixture has risen to 260° C. Then, at 25 mm Hg, further ethylene glycol is distilled off until the melt viscosity of the polyester is 4500 cP. The OH number is 115.

(b) Anhydride hardener: 12 g of trimellitic anhydride, 74 g of a bisanhydride of formula III (wherein R represents ethylene and z is 2) and 14 g of an oligomeric bisanhydride of formula IV (wherein R represents ethylene and u is 1 to 5) are homogenised in a melt. The melt viscosity is 830 cP.

(c) Powder resin (unpigmented): 25 g of anhydride hardener (b) are homogenised with 75 g of polyester (a) containing 0.5% of a flow agent (oligomeric acrylic acid ester) at 100° C. in a screw extruder.

(d) Powder resin (pigmented): The resin of (c) is screw extruded with the addition of 30% by weight of titanium dioxide. The powder resin mixture is electrostatically applied to pre-treated sheet metal to a thickness of $100\mu$ and stoved at temperatures between 140° to 200° C. for 30 minutes to yield a film with thickness of $70\mu$.

EXAMPLE 11

(a) Polyester: 1647 g of trimethylol propane and 356 g of 1,6-hexanediol are mixed together and heated to 210° C. After one hour, 3700 g of standard commercial polyethylene glycol terephthalate in the form of chips are added to the melt. The mixture is then refluxed at 220° to 245° C. until all the polymer is dissolved. Ethylene glycol is then distilled off at 25 mm Hg and at 170° to 251° C. until the melt viscosity of a sample has reached 1780 cP. The OH number is 138.

(b) Anhydride hardener: 7.8 g of trimellitic anhydride, 71.2 g of a bisanhydride of formula III (wherein R represents ethylene and z is 2) 21 g of oligomeric bisanhydrides of formula IV (wherein R represents ethylene and u is z to 3) are homogenised in a melt. The melting viscosity is 1180 cP.

(c) Powder resin (unpigmented): 25 g of anhydride hardener (b) are homogenised with 75 g of polyester 11(a) and processed further as in Example 10(c).

(d) Powder resin (pigmented): Prepared and further processed from mixture 11(c) analogously to Example 10(d).

EXAMPLE 12

(a) Polyester: The same starting polyester is used as in Example 11(a) but in this case it is further condensed to give a melt viscosity of 4200 cP.

(b) Anhydride hardener: The same one is used as in Example 11(b).

(c) Powder resin (umpigmented): Prepared as in Example 11(c).

(d) Powder resin (pigmented): Prepared and further processed as in Example 11(d).

EXAMPLE 13

(a) Polyester: A polyester is prepared from the same constituents as in Example 11(a), but it is further condensed to a melt viscosity of 7550 cP.

(b) Anhydride hardener: The same hardener is used as in Example 11(b).

(c) Powder resin (unpigmented): Prepared as in Example 11(c).

(d) Powder resin (pigmented): Prepared and further processed as in Example 11(d).

EXAMPLE 14

(a) Polyester: A polyester is used with the same basis as in Example 11(a), further condensed to a melt viscosity of 12,300 cP.

(b) Anhydride hardener: The same hardener is used as in Example 11(b).

(c) Powder resin (unpigmented): Processed as in Example 11(c).

(d) Powder resin (pigmented): Prepared and further processed as in Example 11(d).

EXAMPLE 15

(a) Polyester: The same polyester as in Example 11(a) is used, but further condensed to a melt viscosity of 1820 cP.

(b) Anhydride hardener: As in Example 11(b).

(c) Powder resin (unpigmented): Prepared as in Example 11(c).

(d) Powder resin (pigmented): Prepared and further processed as in Example 11(d).

EXAMPLE 16

(a) Polyester: A polyester is used with the same basis as in Example 11(a), but further condensed to a melt viscosity of 38,000 cP.

(b) Anhydride hardener: The same hardener as in Example 11(b) is used.

(c) Powder resin (unpigmented): Prepared as in Example 11(c). However, extrusion is possible only for a short period, as otherwise hardening takes place in the extruder.

(d) Powder resin (pigmented): Preparation and coating occur as in Example 11(d). Again however, extrusion is possible only for a short period, as otherwise hardening takes place in the extruder.

EXAMPLE 17

(a) Polyester: 70 g of the polyester from Example 11(a) are mixed at 180° C. with 30 g of polyester from Example 16(a). The melt viscosity of the mixture is 13,100 cP. The polyester mixture of the present Example, consisting of a highly viscous and a low viscosity polyester, serves to attain certain parameter properties.

(b) Anhydride hardener: The same anhydride hardener is used as in Example 11(b).

(c) Powder resin (unpigmented): Prepared according to Example 11(c).

(d) Powder resin (pigmented): prepared as in Example 11(d).

EXAMPLE 18

(a) Polyester: The same polyester is used as in Example 13(a).

(b) (comparison) anhydride hardener: A twice sublimated pyromellitic anhydride, m.p. 273° C., is used.

(c) (comparison) powder resin (unpigmented): It is prepared as in Example 11(c) but with only 15% by weight of the hardener 18(b) (where the optimum quantity is used).

(d) (comparison) powder resin (pigmented): Pigmented as in Example 11(d), but starting from the powder resin 18(c) with only 15% by weight of hardener. The powder resin can be extruded only with great difficulty, since an undesirable reaction between the compounds occurs in the apparatus.

EXAMPLE 19

(a) Polyester: The same polyester as in Example 13(a) is used.

(b) (comparision) anhydride hardener: Comprises benzophenonetetracarboxylic dianhydride which has been recrystallised from an acetic anhydride/acetic acid solution; m.p. 231° C.

(c) (comparison) powder resin (unpigmented): Prepared as in Example 11(c) but with 20% of hardener which is the optimum quantity.

(d) (comparison) poweder resin (pigmented): Prepared and further processed as in Example 11(d) from the mixture 19(c).

EXAMPLE 20

(a) Polyester: The same polyester is used in Example 13(a).

(b) Anhydride hardener: From 0.5 g of the anhydride hardener from Example 11(b) and 5 of pyromellitic anhydride a homogeneous melt is prepared. It has a melt viscosity of 1130 cP.

(c) Powder resin (unpigmented): Prepared as in Example 11(c).

(d) Powder resin (pigmented): Prepared from the mixture 20(c) and further processed as in Example 11(d).

EXAMPLE 21

(a) Polyester: The same polyester is used as in Example 13(a).

(b) Anhydride hardener: A molten mixture is prepared from 85 g of anhydride hardener prepared as in Example 11(b) and 15 g of pyromellitic anhydride. It has a melt viscosity of 1310 cP.

(c) Powder resin (unpigmented): Prepared as in Example 11(c).

(d) Powder resin (pigmented): Prepared and worked up from the mixture 21(c) as in Example 11(d).

EXAMPLE 22

(a) Polyester: The same polyester is used as in Example 13(a).

(b) Anhydride hardener: A melt is prepared from 90 g of anhydride hardener prepared as in Example 11(b) and 10 g of benzophenonetetracarboxylic anhydride. It has a melt viscosity of 1310 cP.

(c) Powder resin (unpigmented): Prepared as in Example 11(c).

(d) Powder resin (pigmented): Prepared and further processes as in Example 11(d).

EXAMPLE 23

(a) Polyester: The same polyester is used as in Example 13(a).

(b) Anhydride hardener: A melt is prepared from 75 g of anhydride hardener prepared as in Example 11(b) and 25 g of benzophenonetetracarboxylic anhydride. It has a melt viscosity of 1090 cP.

(c) Powder resin (unpigmented): Prepared as in Example 11(c).

(d) Powder resin (pigmented): Prepared and further processed with the mixture 23(c) as in Example 11(d).

EXAMPLE 24

(a1) Polyester: The same polyester is used as in Example 12(a).

(a2) Epoxy resin: An epoxy resin based on diphenylolpropane and epichlorohydrin is used (melt viscosity 210,000cP. epoxide value 0.041, softening point 145° C. measured according to Durrans).

(b) Anhydride hardener: 2.1 g of trimellitic anhydride and 82.6 g of a bisanhydride of formula III (wherein R represents ethylene and z is 2) and 15.3 g of an oligomeric bisanhydride of formula IV (wherein R represents ethylene and u is 2 to 5) are mixed to form a homogeneous melt with a melting viscosity of 210 cP.

(c) Powder resin (unpigmented): 35 g of the epoxy resin 24(a2), 35 g of the polyester 24(a1) and 30 g of the anhydride hardener (b) are extruded at 105° C. in an extruder in such a way that the anhydride hardener is not added, in its molten state, until the last third of the extruder chamber. The parameter values are determined for the extruded material.

(d) Powder resin (pigmented): Prepared and processed analogously to the mixture 24(c), but additionally using 30% by weight of titanium dioxide which is distributed in the anhydride hardener melt.

EXAMPLE 25

(a1) Polyester: The same polyester is used as in Example 14(a).

(a2) Epoxy resin: An epoxy resin based on diphenylolpropane and epichlorohydrin is used (melting viscosity 2800 cP, epoxide value 0.08, softening point 93° C. measured according to Durrans).

(b) Anhydride hardener: The same hardener is used as in Example 24(b).

(c) Powder resin (unpigmented): A mixture of 30 g of epoxy resin as in Example 25(a2), 45 g of the polyester according to Example 25(a1) and 25 g of hardener 25(b) are extruded at 100° C.

(d) Powder resin (pigmented): Prepared from mixture 25(c) with the addition of 30% by weight of titanium dioxide and further processed as in (C).

EXAMPLE 26: Preparation of a matt enamel (a) Powder resin (unpigmented): The preparation of the polyester, epoxy resin and anhydride hardener and the powder resin are the same as in Example 25, but with a weight ratio of epoxy resin: polyester: anhydride hardener of 51:24:25.

(b) Powder resin (pigmented): Prepared from mixture 26(a), but with the addition of 30% by weight of titanium dioxide, and further processed as in Example 25(d).

EXAMPLE 27

(a) Polyester: The same polyester as in Example 13(a) is used, with a melt viscosity of 7550 cP.

(b) Anhydride hardener: A molten mixture is prepared, as in Example 11(b), from 1.6 g of trimellitic anhydride, 78 g of the bisanhydride of formula III (wherein R represents ethylene and z=2) and 20.4 g of an oligomeric bisanhydride of formula IV (wherein R is ethylene and u=2 to 3). It has a melt viscosity of 2560 cP.

(c) Powder resin (unpigmented): 20 g of anhydride hardener are homogenised with 75 g of polyester in an extruder at 95° C. 5 g of anhydride hardener 27(b) are homogenised in a melt at 130° C. with 0.5 g of a basic catalyst consisting of 35% of a compound of formula

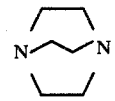

15% of a compound of formula

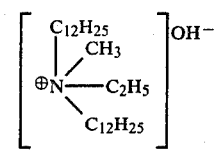

and 50% of a compound of formula

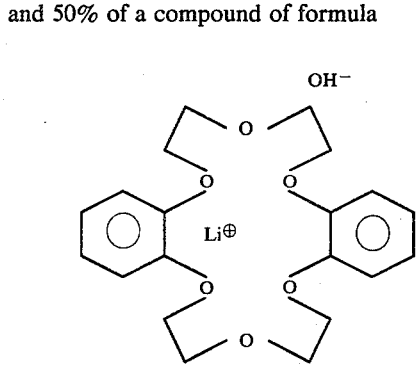

The extruded and the catalysed anhydride hardener are ground together.

(d) Powder resin (pigmented): 75 g of polyester 27(a) and 20 g of anhydride hardener 27(b) are homogenised with 30% by weight of titanium dioxide (based on the total mixture) in an extruder at 100° C. 5 g of bisanhydride hardener of formula III are homogenised as in 27 (C) with 0.5 g of the basic catalyst mixture as in 27 (c). The extruded material and the base-catalysed hardener are ground. The fraction with a particle size of less than 60μ is electrostatically applied to sheet metal or tubes, which have been pre-heated to 240° C., to a thickness of 300μ. The coated work-pieces are cooler after 25 seconds by immersing in ice water.

According to an alternative process, the powder resin described may also be applied by whirl-sintering. Nonporous coatings resistant to impact and acetone are obtained.

EXAMPLE 28

(a) Polyester: The same polyester as in Example 12(a) is used.

(b) Anhydride hardener: The same anhydride hardener is used as in Example 11(b).

(c) Powder resin (unpigmented): Prepared and further processed as in Example 11(c).

(d) Powder resin (pigmented): Worked up as in Example 11(d). The electrostatically coated sheets are pretreated for 45 seconds in a high frequency oven and then hardened at 180° C. for 10 minutes in a circulating air drier. As a result of the pretreatment, an extremely smooth, flawless surface is obtained. The layer thickness is 70μ.

EXAMPLE 29

(a1) Epoxy resin: An epoxy resin based on diphenylolpropane and epichlorohydrin is used (melting viscosity 2300 cP, epoxide value 0.08 softening point 89° C. measured according to Durrans).

(a2) Phenol resin: A phenol resin based on phenol and formaldehyde (phenol resol) is used, with a melting viscosity of 800 cP, iodine colour number (DIN 6162) less than 30, density 1.21 g/cc, stoving residue 95% (DIN 53182).

(b) Anhydride hardener: 10.5 g of trimellitic anhydride, 60.3 g of the bisanhydride hardener of formula III (wherein R represents an ethyl ether group and z=2) and 29.2 g of an oligomeric bisanhydride of formula IV (wherein R represents an ethyl ether group and $\mu=2$ to 4) are homogeneously mixed to form a melt with a melt viscosity of 2700 cP.

Powder resin (unpigmented): 60 g of epoxy resin, 20 g of phenol resin and 20 g of anhydride hardener are homogenised in an extruder at 90° C. The yellowish solid resin is ground in a jet mill to a particle size of less than 15μ. Tin plate containers are electrostatically coated with this powder resin and stoved for 10 minutes at 195° C. The final layer thickness is 15μ. Yellowish, non-porous coatings free from cracks are obtained, with excellent adhesion to the metal and are very good chemical resistance.

EXAMPLE 30

(a1) Epoxy resin: An epoxy resin based on diphenylolpropane and epichlorohydrin is used (melting viscosity 980 cP, epoxide value 0.06, softening point 63).

(a2) Phenol resin: A phenol resin based on phenol and formaldehyde (phenol resol) is used, with a melting viscosity of 1500 cP, iodine colour number less than 40, density 1.26 g/cc stoving residue 95%.

(b) Anhydride hardener: The same anhydride hardener as in Example 2(b) is used.

(c) (comparison) Powder resin (unpigmented): 35 g of epoxy resin, 35 g of phenol resin and 30 g of anhydride hardener are finely powdered at 0° C. in a ball mill. Tin plate containers are coated with this powder mixture under the conditions given in Example 29 and stoved. A sealed surface is not obtained.

EXAMPLE 31

(a) Polyester: 469 g (3.5 mol) of trimethylolpropane, 313 g (2.65 mol) of 1,6-hexanediol, 6.8 g (0.05 mol) of pentaerythritol, 21.2 g (0.2 mol) of diethylene glycol and 26 g (0.25 mol) of neopentyl glycol are melted at 180° C. and 960 g of polyethylene glycol terephthalate (average molecular weight about 30,000) are added. The mixture is heated to 220° C. until the polymer has clearly dissolved. Then 885 g of poyethylene glycol isophthalate are added (average molecular weight about 12,000). The mixture is slowly heated to 230° C. and 370 g of ethylene glycol are distilled off under vacuum from a water jet pump (20 mm Hg). The melt viscosity of the polyester is 3800 cP and the OH number is 126.

(b) Anhydride hardener: 11 g of trimellitic anhydride, 72 g of a bisanhydride of formula III (wherein R is ethylene and z=2) and 17 g of an oligomeric bisanhydride of formula IV (wherein R is ethylene and $\mu=2$ to 5) are mixed to form a homogeneous melt with a melt viscosity of 950 cP.

(c) Powder resin (unpigmented): 75 g of polyester 31 (a) and 25 g of anhydride hardener 31 (b) are homogenised at 105° C. in the extruder. The product obtained is ground to a particle size of 100μ in a cross beater mill.

(d) Powder resin (pigmented): The unpigmented powder resin 31 (c) is mixed with 30% by weight of titanium dioxide and homogenised at 100° C. in an extruder. After being ground to a particle size of 100μ, the mixture is applied electrostatically and, after stoving at 140° to 200° C., gives a layer thickness of 80μ.

EXAMPLE 32

(a) Polyester: 509.2 g (3.8 mol) of trimethylolpropane, 354 g (3 mol) of 1,6-hexanediol, 41.6 g (0.4 mol) of neopentylglycol and 6.8 g (0.05 mol) of pentaerythritol and 42.2 g (0.4 mol) of diethylene glycol are melted at 185° C. and 1845 g of polyethylene glycol terephthalate (average molecular weight about 30,000) are added within 2 hours. Then the reaction temperature is increased to 240° C. and the mixture is refluxed until the polyethylene glycol terephthalate is completely dissolved. This takes about 4 hours. After cooling to 180° C., ethylene glycol is distilled off, under vacuum from a water jet pump (32 mm Hg), until the melting viscosity of the mixture is 4200 cP. After cooling, a light-coloured glassy resin is obtained. The OH number is 120.

(b) Anhydride hardener: 8 g of trimellitic anhydride, 65 g of bisanhydride of formula III (wherein R represents ethylene and z=2) and 27 g of an oligomeric bisanhydride of formula IV (wherein R represents ethylene and $\mu=2$ to 5) are homogenised in a melt. The melt viscosity is 1600 cP.

(c) Powder resin (unpigmented): A mixture of 72 g of polyester 32 (a) and 28 g of the anhydride hardener 32 (b) is homogenised in the extruder at 115° C. The extruded material obtained is ground in a roller mill.

(d) Powder resin (pigmented): The unpigmented powder resin 32(c) is extruded a second time in the extruder with 30% by weight of titanium dioxide and 1% by weight of flow agent (a polymeric acrylic resin, Trade ACRONAL 4F). The homogeneous powder resin is ground to a particle size of less than 100μ and then applied to sheet iron in a layer thickness of 75μ.

Table 1

| Example | Parameters | | | |
|---|---|---|---|---|
| | Stability | Flow time s | Gel time s | Melt viscosity (cP/100° C.) |
| 1c) | >100 | <10 | 17 | 6150 |
| 2c) | 16 | 25 | 224 | 4000 |
| 3c) | 1.4 | 600 | >1800 | 8750 |
| 4c) | 1.5 | 280 | >1800 | 11200 |
| 5c) | 1.1 | ~800 | >1800 | 600 |
| 6c) | 2 | 18 | 135 | 40000 |
| 7c) | 5 | 30 | 220 | 22700 |
| 8c) | >90 | 8 | 46 | 15900 |
| 9c) | 3.5 | 107 | 364 | 15000 |
| 10c) | 2.5 | 190 | 435 | 3520 |
| 11c) | 6 | 320 | >1800 | 1575 |
| 12c) | 4 | 180 | 500 | 3100 |
| 13c) | 3 | 137 | 485 | 5500 |
| 14c) | 2.8 | 80 | 305 | 8800 |
| 15c) | 2.8 | 40 | 180 | 13000 |
| 16c) | 3 | 15 | 30 | 29400 |
| 17c) | 3 | 68 | 102 | 11000 |
| 18c)* | 4.8 | 95 | 210 | 8000 |
| 19c)* | 4.2 | 120 | 345 | 6300 |
| 20c) | 3.2 | 133 | 413 | 6700 |
| 21c) | 4.1 | 120 | 342 | 7500 |
| 22c) | 4.1 | 142 | 463 | 5800 |
| 23c) | 4.3 | 151 | 510 | 5600 |
| 24c) | 6.2 | 14 | 38 | 60000 |
| 25c) | 2.5 | 170 | 530 | 1380 |
| 26a) | 2.7 | 178 | 610 | 6300 |
| 27c) | 14 | 35 | 60 | 6150 |
| 28c) | 4 | 180 | 500 | 3100 |
| 29c) | 7 | 50 | 78 | 1850 |
| 30c)* | 35 | 14 | 21 | 1580 |
| 31c) | 1.8 | 220 | 540 | 3000 |

Table 1-continued

| Example | Stability | Flow time s | Gel time s | Melt viscosity (cP/100° C.) |
|---|---|---|---|---|
| 32c) | 2 | 190 | 435 | 3150 |

*comparison

Table 2

| Example | 1 | | | | 2 | | | |
|---|---|---|---|---|---|---|---|---|
| Stoving temperature | 140 | 160 | 180 | 200 | 140 | 160 | 180 | 200 |
| Gloss(acc. to Lange) | 40 | 40 | 40 | 45 | 60 | 77 | 72 | 75 |
| Erichsen depression mm | 0.2 | 0.2 | 1.0 | 3.2 | 0.2 | 0.8 | 3.2 | 8.3 |
| impact depression inch/lb. | <4 | <4 | <4 | 4 | >4 | >4 | >4 | 20 |
| Acetone test | 4 | 1 | 0 | 0 | 5 | 2 | 0 | 0 |

| Example | 3 | | | | 4 | | | |
|---|---|---|---|---|---|---|---|---|
| Gloss(acc. to Lange) | 94 | 96 | 94 | 94 | 96 | 98 | 94 | 94 |
| Erichsenl depression mm | 0.2 | 0.8 | 2.6 | 4.6 | 0.3 | 0.7 | 2.0 | 4.2 |
| Impact depression in./lb. | <4 | <4 | <4 | <4 | <4 | <4 | <4 | 4 |
| acetone test | 5 | 5 | 5 | 4 | 5 | 5 | 5 | 4 |

| Example | 5 | | | | 6 | | | |
|---|---|---|---|---|---|---|---|---|
| Gloss(acc. to Lange) | 104 | 102 | 102 | 100 | 81 | 82 | 84 | 88 |
| Erichsen depression mm | 0.2 | 0.3 | 0.8 | 1.0 | 2.6 | 3.6 | 4.7 | 9.2 |
| Impact depression in./lb. | <4 | <4 | <4 | <4 | <4 | <4 | <4 | 32 |
| Acetone test | 5 | 5 | 5 | 5 | 2 | 1 | 0 | 0 |

| Example | 7 | | | | 8 | | | |
|---|---|---|---|---|---|---|---|---|
| Gloss(acc. to Lange) | 86 | 84 | 88 | 86 | 40 | 36 | 32 | 37 |
| Erichsen depression mm | 0.3 | 2.5 | 7.0 | 9.5 | 0.2 | 0.2 | 0.3 | 0.8 |
| Impact depression in./lb. | <4 | <4 | 16 | 40 | <4 | <4 | <4 | <4 |
| Acetone test | 5 | 4 | 2 | 2 | 5 | 4 | 4 | 4 |

| Example | 9 | | | | 10 | | | |
|---|---|---|---|---|---|---|---|---|
| Gloss(acc. to Lange) | 90 | 88 | 92 | 92 | 99 | 99 | 100 | 96 |
| Erichsen depression mm | 3.0 | 6.0 | 7.3 | 7.5 | 10.8 | 11.2 | 10.9 | 11.0 |
| Impact depression in./lb. | <4 | <4 | <4 | 4 | 36 | 160 | 160 | 160 |
| Acetone test | 5 | 4 | 3 | 1 | 2.5 | 1.5 | 0 | 0 |

| Example | 11 | | | | 12 | | | |
|---|---|---|---|---|---|---|---|---|
| Stoving temperature | 140 | 160 | 180 | 200 | 140 | 160 | 180 | 200 |
| Gloss(acc. to Lange) | 105 | 103 | 107 | 102 | 99 | 98 | 99 | 96 |
| Erichsen depression mm | 0.1 | 0.4 | 3.5 | 9.5 | 10.3 | 10.6 | 10.5 | 10.2 |
| Impact depression in./lb. | <4 | <4 | 4 | 16 | <4 | 52 | 156 | 160 |
| Acetone test | 5 | 5 | 4 | 2 | 4.5 | 1.5 | 0 | 0 |

| Example | 13 | | | | 14 | | | |
|---|---|---|---|---|---|---|---|---|
| Gloss(acc. to Lange) | 96 | 97 | 97 | 95 | 88 | 90 | 87 | 89 |
| Erichsen depression mm | 10 | 9.8 | 10.7 | 10.4 | 11.2 | 11.5 | 10.7 | 11.0 |
| Impact depression in./lb. | 4 | 60 | 160 | 160 | <4 | 80 | 160 | 160 |
| Acetone test | 3.5 | 2 | 0 | 0 | 4 | 3 | 0 | 0 |

| Example | 15 | | | | 16 | | | |
|---|---|---|---|---|---|---|---|---|
| Gloss(acc. to Lange) | 80 | 82 | 83 | 81 | <50 | 53 | <50 | <50 |
| Erichsen depression mm | 10.4 | 10.1 | 11.0 | 11.1 | 2.2 | 3.5 | 1.5 | 4 |
| Impact depression in./lb. | 4 | 100 | 160 | 160 | <4 | <4 | 4 | 8 |
| Acetone test | 3 | 2 | 1 | 0 | 2 | 0 | 0 | 0 |

| Example | 17 | | | | 18 | | | |
|---|---|---|---|---|---|---|---|---|
| Gloss(acc. to Lange) | 84 | 87 | 87 | 85 | 40 | 36 | 32 | 38 |

Table 2-continued

| | | | | | | | | |
|---|---|---|---|---|---|---|---|---|
| Erichsen depression mm | 10.1 | 10.5 | 11.0 | 10.2 | 8 | 8.5 | 9.5 | 8.5 |
| Impact depression in./lb. | <4 | 45 | 110 | 160 | <4 | 20 | 80 | 100 |
| Acetone test | 4 | 2 | 0 | 0 | 5 | 4 | 2 | 2 |

| Example | 19 | | | | 20 | | | |
|---|---|---|---|---|---|---|---|---|
| Gloss(acc. to Lange) | 80 | 81 | 84 | 80 | 89 | 91 | 91 | 90 |
| Erichsen depression mm | 4 | 9.5 | 9.7 | 9.3 | 9.4 | 9.3 | 9.2 | 9.8 |
| Impact depression in./lb. | <4 | 4 | 100 | 120 | 4 | 32 | 100 | 140 |
| Acetone test | 5 | 4 | 3 | 3 | 4 | 2 | 0 | 0 |

| Example | 21 | | | | 22 | | | |
|---|---|---|---|---|---|---|---|---|
| Gloss(acc. to Lange) | 85 | 87 | 84 | 88 | 86 | 85 | 90 | 81 |
| Erichsen depression mm | 8 | 9.1 | 9.5 | 9.5 | 7.4 | 9.0 | 9.2 | 9.1 |
| Impact depression in./lb. | 4 | 44 | 80 | 120 | 4 | 20 | 100 | 160 |
| Acetone test | 4 | 3 | 3 | 1 | 4 | 3 | 2 | 0 |

| Example | 23 | | | | 24 | | | |
|---|---|---|---|---|---|---|---|---|
| Stoving temperature | 140 | 160 | 180 | 200 | 140 | 160 | 180 | 200 |
| Gloss(acc. to Lange) | 86 | 90 | 91 | 90 | 40 | 42 | 36 | 30 |
| Erichsen depression mm | 7.8 | 9.3 | 9.5 | 9.7 | 0.2 | 4.0 | 0.3 | 0.9 |
| Impact depression in./lb. | 4 | 20 | 120 | 120 | <4 | <4 | <4 | 4 |
| Acetone test | 3 | 2 | 1 | 0 | 0 | 0 | 1 | 0 |

| Example | 25 | | | | 26 | | | |
|---|---|---|---|---|---|---|---|---|
| Gloss(acc. to Lange) | 95 | 98 | 100 | 94 | 15 | 12 | 16 | 18 |
| Erichsen depression mm | 10.5 | 10.3 | 11.2 | 10.1 | 9.0 | 9.5 | 8.9 | 8.7 |
| Impact depression in./lb. | 160 | 160 | 160 | 160 | 100 | 160 | 160 | 160 |
| Acetone test | 0 | 0 | 0 | 0 | 1 | 0 | 0 | 0 |

| Example | 28 | | | | 31 | | | |
|---|---|---|---|---|---|---|---|---|
| Gloss(acc. to Lange) | | 102 | | | 98 | 99 | 101 | 101 |
| Erichsen depression mm | | 11.2 | | | 10.7 | 11.0 | 10.8 | 10.8 |
| Impact depression in./lb. | | >160 | | | 28 | 88 | 160 | >160 |
| Acetone test | | 0 | | | 2 | 1 | 0 | 0 |

| Example | 32 | | | |
|---|---|---|---|---|
| Gloss(acc. to Lange) | 99 | 99 | 96 | 100 |
| Erichsen depression mm | 10.8 | 11.2 | 10.5 | 10.9 |
| Impact depression in./lb. | 36 | 160 | 160 | 156 |
| Acetone test | 2.5 | 1.5 | 0 | 0 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A highly-reactive powder resin composition suitable for use in the production of coatings consisting essentially of a mixture of (A) one or more polymers containing groups selected from hydroxyl and 1,2 epoxy-groups, having a melt viscosity of 2,000 to 20,000 cP at 160° C. and a melting range of from 45° to 95° C., and mixtures of said polymers; and (B) one or more compounds of formula (I) of the attached drawings wherein R represents a radical selected from the group consisting of (a) an unsubstituted mono- to pentavalent aliphatic hydrocarbon group containing from 1 to 28 carbon atoms, (b) a radical (a) being substituted by one of the groups an ester group containing from 1 to 6 carbon atoms and a carboxy group, (c) a radical (a) being interrupted at least once by one of the linkages an O-ether linkage and a —HC=CH group, (d) a piperazine group, and (e) a group of one of the formulae (XVI) and (XVII) of the attached drawings an aromatic group containing from 6 to 43 carbon atoms of one of the formulae (X) to (XV) of the attached drawings wherein $R^3$ is a member selected from the group consisting of hydrogen, a halogen atom, an alkyl and an alkoxy group each containing from 1 to 6 carbon atoms and X represents a member selected from the group consisting of an oxygen atom, sulphinyl, sulphonyl, carbonyl and a group of the formulae (XVa) of the attached drawings in which n has the value 1 to 8; $R^1$ represents a radical selected from the group consisting of phenyl, naphthyl, phenanthryl, aminonaphthyl and a heterocyclic tetranhydrofuryl group such that the anhydride grouping is attached to the said $R^1$ group on vicinyl carbon atoms; and y is an integer from 2 to 4 said component B having a melt viscosity of 50 to 15,000 cP at 160° C. and a melting range of from 40° to 250° C;

the combination of A and B having a melt viscosity of from 500 to 20,000 cP at 160° C., a stability of from 1 to 15 at 100° C., a flow time of from 20 to 600 s at 160° C., and a gel time of from 35 to 1,200 s at 160° C.

2. A composition as claimed in claim 1 wherein the weight ratio of component (A) to component (B) is from 40:60 to 95:5.

3. A composition as claimed in claim 1 wherein component (A) is selected from the group consisting of a polyester having free hydroxy groups and an epoxy resin having an epoxy value of from 0.02 to 0.35.

4. A composition as claimed in claim 1 wherein in component (A) the weight ratio of the polymers containing hydroxy compounds to the polymers containing epoxy compounds is (20 to 100):(80 to 0).

5. A composition as claimed in claim 1 wherein 100 g of component (B) contain from 0.34 to 0.48 anhydride groups.

6. A composition as claimed in claim 1 wherein component (B) consists essentially of a mixture selected from the group consisting of (a) monomers, (b) polymers, (c) a combination of (a) and (b).

7. A composition as claimed in claim 1 wherein component (B) consists essentially of an oligomer containing a radical selected from the group consisting of (a) at least one anhydride group, (b) a group (a) in combination with at least one free carboxylic group (c) a group (a) in combination with an ester group and (d) a combination of (b) and (c).

8. A composition as claimed in claim 1 wherein component (B) consists essentially of a type selected from the group consisting of (a) at least one compound of formulae (II) to (IV) of the attached drawings, (b) a combination of (a) with at least one compound of formulae (V) and (VI) of the attached drawings wherein R is as defined in claim 1, z represents an integer from 2 to 3 and $\mu$ represents an integer from 1 to 8.

9. A composition as claimed in claim 1 wherein component (B) contains trimellitic anhydride in combination with at least one compound of formulae (III) and (IV) of the attached drawings, wherein R, z and $\mu$ are as defined in claim 8.

10. A composition as claimed in claim 1 wherein in component (B) the weight ratio percentage of compounds II, III and IV is (20 to 50):(20 to 90):(5 to 60), the total of the amount being always 100 percent.

11. A composition as claimed in claim 1 containing as an additional conventional additive a pigment and the weight ratio of the solids in the binder to the total quantity of pigment being 1:0.1 to 1:10.

12. A composition as claimed in claim 1 additionally containing a hardening catalyst.

13. An article coated with a coating composition as claimed in claim 1.

14. An article as claimed in claim 13 wherein the coating has been hardened at a temperature of 120° to 180° C.

15. An article as claimed in claim 13 consisting essentially of a coating selected from the group consisting of (a) a matt lacquer-coating wherein component (A) comprises a combination of polyesters and epoxy resins and (b) a single coating.

16. A highly-reactive powder resin composition suitable for use in the production of coatings consisting essentially of a mixture of (A) one or more polymers containing at least one type of groups selected from hydroxyl and 1,2-epoxy groups, having a melt viscosity of 2,000 to 20,000 cP at 160° C. and a melting range of from 45° to 95° C. and mixtures of said polymers; and (B) one or more compounds of formula (I) of the attached drawings wherein R represents a radical selected from the group consisting of
(a) an unsubstituted mono- to pentavalent aliphatic group containing from 1 to 28 carbon atoms,
(b) a radical (a) being substituted by one of the groups an ester group containing from 1 to 6 carbon atoms and a carboxy group, and
(c) a radical (a) being interrupted at least once by one of the linkages an O-ether linkage, or a group of formula (XVII) of the attached drawings $R^1$ represents phenyl or naphthyl, such that the anhydride grouping is attached to the said $R^1$ group on vicinyl carbon atoms; and y is an integer from 2 to 4 said component B having a melt viscosity of 50 to 15,000 cP at 160° C. and a melting range of from 40° to 250° C.; the combination of A and B having a melt viscosity of from 500 to 20,000 cP at 160° C., a stability of from 1 to 15 at 100° C., a flow time of from 20 to 600 s at 160° C., and a gel time of from 35 to 1,200 s at 160° C.

* * * * *